Patented Aug. 23, 1932

1,873,849

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

SYNTHETIC RESIN AND PROCESS OF MAKING THE SAME

No Drawing. Application filed November 26, 1928. Serial No. 322,099.

This invention relates to the preparation of a synthetic resin from diphenylol cyclohexane and formaldehyde and also to coating or plastic compositions containing derivatives of cellulose, and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing organic substitution products of cellulose such as cellulose acetate, which resin is compatible with the other constituents of the lacquers and which produces clear solutions which, upon drying, form films that are adherent, tough, hard and water repellent.

The preparation of a lacquer containing organic derivatives of cellulose such as cellulose acetate as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

I have found that the synthetic resins produced from a diphenylol naphthene, such as diphenylol cyclohexane and formaldehyde, are compatible with cellulose acetate and that when added to lacquers containing cellulose acetate they form clear solutions that, upon drying, produce clear, hard, tough and firmly adherent films.

The selection of a suitable resin for a lacquer containing the organic derivatives of cellulose presents a difficult problem because the resin must be compatible with the organic derivatives such as cellulose acetate, both in solution and in the dry films and also with softeners, pigments, dyes which may be added to produce the desired effects and variations of the films. In general, a synthetic resin for this purpose should be easily prepared from preferably cheap materials, it should be free of or easily freed from catalysts, either alkaline or acid, used in its preparation, it should of itself be practically neutral and should be strongly resistant to water and free from water soluble materials.

In accordance with my invention, I prepare a synthetic resin formed by the condensation of diphenylol cyclohexane and formaldehyde. This synthetic resin is then used for making a lacquer or a plastic composition, which contains one or more derivatives of cellulose and a volatile solvent. The lacquer may also contain one or more natural or semi-synthetic resins or gums, one or more plastifiers or softening agents, medium and/or high boiling point solvents and preferably but not necessarily some pigments and/or dyes.

The solutions thus formed may be employed as lacquer or coating compositions for metal, glass or other surfaces and may be used for making photographic or other films.

Artificial yarn may be formed by extruding the solutions containing the resin and a derivative of cellulose through the orifices of a spinneret, either into a heated evaporative atmosphere as in dry spinning, or into a precipitating bath, as in wet spinning. The solution may be also employed as an adhesive, and is particularly useful in this connection for making shatterless glass by causing celluloid sheets to adhere to surfaces of sheets of glass between which they are placed.

The plastic containing derivatives of cellulose and resin may be worked into sheets which may also be used for laminated glass, and also may be worked into blocks or articles in any known manner. The derivatives of cellulose that may be used for making solutions, coating or plastic compositions, comprises any suitable derivative, such as cellulose nitrate or organic derivatives of cellulose. Examples of organic derivatives of cellulose are organic esters of cellulose, such as cellulose acetate, cellulose formate, cellulose propionate, or cellulose butyrate and cellulose ethers such as ethyl cellulose, methyl cellulose or benzyl cellulose.

The low boiling point solvent that may be employed may be one of a mixture of two or more of the following: acetone, alcohol, benzene, or ethylene dichloride. Examples of medium and/or high boiling point solvents are: ethyl acetate, ethyl lactate, tetrachlorethane, benzyl alcohol or diacetone alcohol. Examples of suitable plastifiers are: diphenylol propane, monomethyl xylene sulphonamide, ortho or meta ethyl toluene sulphonamide. If desired, fire retardants may be added, particularly the very effective bromine derivatives of organic compounds, such as brominated tricresyl phosphate.

The pigments or dyes that may be used are any of the ordinary pigments or dyes used in the paint or lacquer industry.

Of the natural gums or resins that may be employed, the following may be mentioned: Manila, accaroides, Pontianak, kauri, dammar, rosin and shellac.

The semi-synthetic resin, ester gum, which is the glycerol ester of rosin may also be added. Examples of other synthetic resins that may be used in conjunction with my resin, are the fusible and soluble phenol-formaldehyde or diphenylol propane-formaldehyde resins preferably prepared in the presence of acid catalysts, and phenol-furfural resins, toluene sulphonamide-formaldehyde resins, toluene sulphonamide-furfural resins.

The following is a detailed description of one mode of preparing our resin: In this description, in place of pure diphenylol cyclohexane, a more or less purified mixture resulting from the condensation of phenol with cyclohexanone may be used. The preparation of both the crude and the pure material is described in my copending application Serial No. 322,100 filed herewith. The cyclohexanone may be replaced either wholly or in part by other cyclic ketones, examples of which are cyclopentanone, cycloheptanone and methyl cyclohexanone. 264 parts of diphenylol cyclohexane and 75 parts of 40% formaldehyde solution, that is approximately equimolecular proportions, are heated under reflux together with .01 to 5% of the weight of the diphenylol cyclohexane or more of a suitable catalyst. The proportion of catalyst may be varied very considerably according to the product desired, but in general where it is desired to produce a resin suitable for use with cellulose derivatives, a small amount is preferable. However, in some cases, where for example an organic catalyst is used such as urea, a large proportion, say 5 to 10% of the weight of the diphenylol cyclohexane may not be harmful, and for some purposes may be beneficial. In the preferred mode of our preparation, we use 25% of an acid, such as phosphoric or boric acid as a catalyst, but other acids and also alkalies may also be used.

The heating under reflux is continued until a resin is obtained which solidifies at about 50° C. It is washed with water to remove excess reactants or catalysts. It may be dissolved in caustic soda or alcohol or other solvents, and submitted to any suitable purification process. It may be distilled either under vacuum or at ordinary pressure to remove water or other volatile substances remaining in it, and subsequent to the distillation or as a part of the distillation process, it may be fused at a temperature of from 150–200° C. or more, in order to harden it, without at the same time converting it into an infusible or insoluble modification. The resin thus produced has a melting point of 140–150° C. Reaction may be caused to proceed in various other slightly different ways as is well known to one skilled in the art.

If desired, other synthetic or natural resins may be added to this resin at any stage of its preparation, or another resin may be formed at the same time simultaneously. Thus, for example, diphenylol propane may be added to the diphenylol cyclohexane, and a mixed resin produced; also as stated above, urea may be added and a mixed resin produced. A substantial quantity of toluene sulphonamide may also be added and a toluene sulphonamide formaldehyde resin produced simultaneously. After its preparation, the resin may be fused or mixed with or dissolved in solvents with any other suitable synthetic resins or natural resins, and thereafter used together with cellulose derivatives as heretofore described.

It is to be understood that the foregoing detailed description is given merely by way of illustration and that many variations may be made therein without departing from the spirit of this invention.

Having described my invention what I claim and desire to secure by Letters Patent is:

1. Method of forming a resin comprising condensing a diphenylol naphthene with formaldehyde in the presence of a catalyst.

2. Method of forming a resin comprising condensing diphenylol cyclohexane with formaldehyde in the presence of a catalyst.

3. A resin formed by the condensation of a diphenylol naphthene with formaldehyde in the presence of a catalyst.

4. A resin formed by the condensation of diphenylol cyclohexane with formaldehyde in the presence of a catalyst.

In testimony whereof, I have hereunto subscribed my name.

WILLIAM HENRY MOSS.